No. 3,166,687
TRANSPARENT ELECTROLUMINESCENT CELL AND GLASS BLOCK
Frank Veres, Toledo, Ohio, assignor to Owens-Illinois Glass Company, a corporation of Ohio
Filed Dec. 30, 1960, Ser. No. 79,606
3 Claims. (Cl. 313—108)

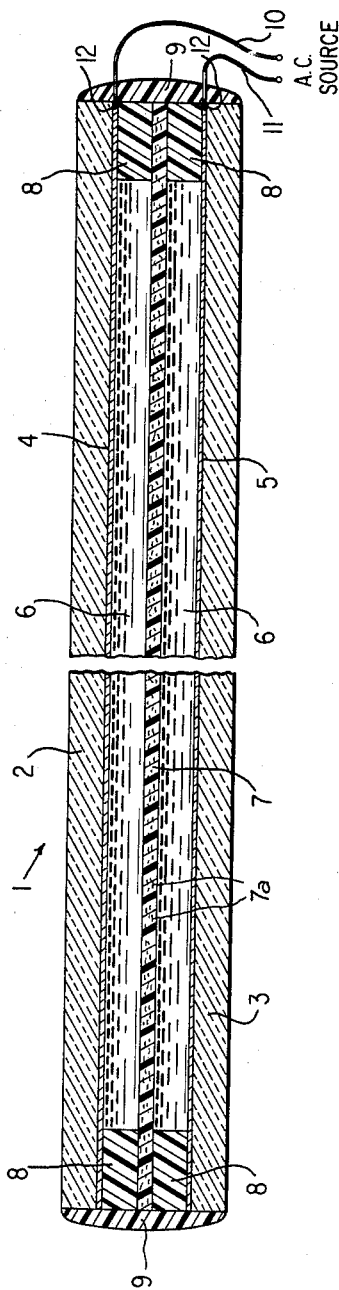
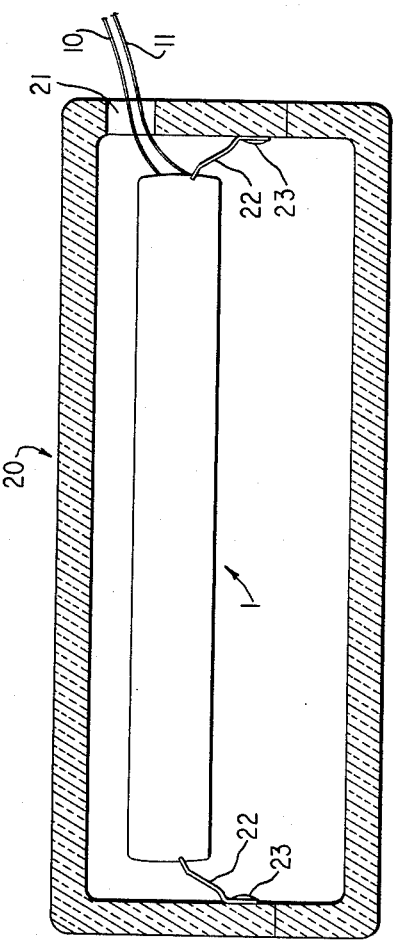

This invention relates to electroluminescent cells and particularly to a cell construction characterized by improved transparency and efficiency. This invention also relates to a novel structural unit.

The phenomenon of electroluminescence, which consists of the emission of light from a phosphor when subjected to an electric field, has been the subject of considerable research and study in recent years. One obstacle to the widespread use of light sources based upon this phenomenon is that when relatively bright or efficient electroluminescent lamps are constructed utilizing a plastic dielectric to suspend the phosphors between the electrodes of the cell, the electroluminescent cell undergoes a gradual diminution of light output due to moisture permeation of the plastic. This problem cannot be completely overcome by using a moisture impermeable dielectric such as glass. The use of glass as a dielectric requires that the phosphor and glass mixture be heated to temperatures of 1200° F., or higher, to fuse the glass. The electroluminescent phosphors, particularly those consisting of the sulfides and selenides of zinc and cadmium, are adversely affected by this high temperature fusion process. Therefore, cells made with moisture impermeable glass dielectrics have substantially lower initial brightness and efficiency.

Hollow glass blocks have enjoyed acceptance as structural units due to their ability to transmit and control daylight. Obviously, in the absence of daylight these natural advantages of the glass units are no longer operative. In the present state of the art, glass blocks which have both daylight transmitting and controlling properties and nighttime light generating properties are not practical as the means and apparatus for generating light inside of the glass block substantially reduces the glass block's transparency and hence correspondingly reduces the glass block's utility for controlling daylight.

Accordingly, it is an object of this invention to provied an electroluminescent cell with improved transparency to visible light.

A further object of this invention is to provide a structural unit capable of transmitting and controlling daylight and simultaneously capable of generating artificial light for illumination or for decorative purposes.

A further object of this invention is to provide an electroluminescent cell which is characterized by a high initial light output, which light output is not reduced or diminished by moisture permeation.

A further object of this invention is to provide an electroluminescent cell having improved electrical and optical coupling between the transparent electrodes and the phosphor particles.

This invention will be better understood by reference to the accompanying drawings wherein:

FIGURE 1 is a cross-section view of an electroluminescent cell constructed in accordance with the present invention.

FIGURE 2 is a cross-section of a glass block incorporating the cell of FIGURE 1.

Referring to FIGURE 1, numeral 1 indicates an electroluminescent cell comprising an upper glass plate 2 and a lower glass plate 3 each coated with thin transparent conducting layers 4 and 5, respectively. Separating said layers is a liquid dielectric 6 which has positioned therein a plastic dielectric sheet 7 containing dispersed phosphor particles 7a. The plastic sheet 7 is maintained in a central position within said cell 1 by means of insulating spacers 8 such as mica. The entire cell is sealed at its terminal ends by means of a plastic seam 9, and electrical leads 10 and 11 from a source of alternating current are attached to the transparent conducting layers 4 and 5, respectively.

With regard to the phosphor which can be employed, various phosphors are available. Representative thereof is "Radelein" which is an electroluminescent phosphor obtainable from the U.S. Radium Corp., Morristown, New Jersey. By way of example Radelein No. 3663 phosphor gives a green electroluminescence which has proven satisfactory for certain applications.

As to the plastic dielectric, which carries the phosphor, it is essential that it be characterized by having a high dielectric constant, low dissipation factor, and high resistivity. A satisfactory plastic dielectric for this purpose is Cyanocel, which is a cyanoethylated cellulose, made by American Cyanamid and referred to in U.S. Patent 2,901,652. (See also Chemical Week of May 28, 1960, pages 103–4.) However, other formulations can be employed for this plastic dielectric and representative formulations are described in detail in U.S. Patent 2,851,634.

The actual preparation of the phosphor containing plastic dielectric can be effected in a number of ways. For example, a liquid mixture of the phosphor and plastic can be made up and then sprayed upon a substrate to the desired thickness. After curing the resulting phosphor containing plastic dielectric is stripped from the substrate and cut to the desired size. In addition, conventional plastic film forming techniques can be employed by using a plastic mixture containing a phosphor.

The liquid dielectric can be any of the well-known insulating oils such as castor oil, lubricating oil, banana oil, and the like with castor oil being preferred.

By way of specific example, the novel electroluminescent cell of this invention comprises members 2 and 3 of FIGURE 1 which are two parallel sheets of polished plate glass. Although the plates are shown as being flat, it is apparent that the plates could be curved parallel plates. These plates are coated with conductive layers 4 and 5, respectively, of tin oxide. This coating is effected as described in U.S. 2,522,531 although other known methods can be used. The plastic dielectric 7 containing the phosphor (activated zinc sulfide) is made one-half mil thick and the glass plates 2 and 3 are spaced two mils apart. Mica members 8 maintain the glass plates and plastic dielectric 7 (cyanoethylated cellulose) in proper spaced relationship. The remaining space of approximately three-fourths mil is occupied by the liquid dielectric 6, namely, castor oil.

The lead wires 10 and 11 are attached to the conducting layers 4 and 5, respectively, simply by soldering the same to the spot 12 of conductive silver painted upon the tin oxide of layers 4 and 5. A resin composition is then applied at the lateral edges to form a seal for the completed cell 1 which will emit light by the phenomenon of electroluminescence when the terminals or wires 10 and 11 are connected to a source of 110–115 volt, 60, cycle A.C., as is well known in the art. Higher voltages and/or higher frequencies may be used.

Various resin compositions can be employed to make the seal 9 for cell 1. Among the resin compositions which can be used are the epoxy resins. Examples of epoxy resins are those made by reacting one or more mols of epichlorhydrin or glycerol dichlorhydrin with 2 mols of bisphenol A in the presence of sodium hydroxide and at elevated temperatures of from about 50° to 150° C. The epoxy resins are represented by the formula

where $n$ is an integer of from 0 to 7 depending upon the relative proportions of bisphenol A and epichlorhydrin, etc.

A number of these epoxy resins are commercially available under the trade designations Epon of the Shell Chemical Corporation and Araldite of the Ciba Company. Included are Epon 562, 828, 864, 1001, 1007 and 1009, among others.

Epon 1001 and 1007 are examples of epoxy resins which differ mainly in their degree of polymerization or molecular weight. For instance, Epon 1001 has a melting point, Durrans Mercury Method, of 65–75° C., while Epon 1007 has a melting point 125–35° C. Epon 1001 is a solid, unesterified epoxy resin, while Epon 828, for example, is a liquid, low molecular weight epoxy resin which is quite viscous, and Epon 1009 is a solid, high molecular weight epoxy resin.

Among the known curing agents for the epoxy resins are included the functional amines, such as diethylenetriamine, triethylenetetramine, tetraethylenepentamine, diethylaminopropylamine, dibutylaminopropylamine, metaphenylenediamine, and the like. Dicyandiamide has also been used as an effective curing agent for epoxy resins. The curing agents are usually present in an amount of from about 2 to 6% by weight of the mixture of epoxy resin.

To anchor the epoxy resin more securely to the lateral edges of the glass plates 3, mica spacers 8, and dielectric 7, a silane primer can be included in the resin composition in an amount of from 0.5 to 5.0% based on the epoxy resin. Among the preferred silanes are the amino-substituted alkylakoxy silanes including, for example, gamma-aminopropyltriethoxy silane and delta-aminobutylmethyldiethoxy silane.

The resin composition can be applied by any one of the methods known in the art such as spraying, dipping, trowelling, and the like.

In FIGURE 2 there is shown a glass block 6½" square of conventional construction with the cell of FIGURE 1 positioned therein by means of resilient metal clips 22 engaging grooves in the plastic seal 9 of cell 1. Clips 22 are attached to the inner wall of block 20 by means of solder glass 23. The leads can be brought out of the block 20 through the vent hole 21 and, if desired, the vent hole can thereafter be sealed tight. Moreover, it is evident that other means could be employed for supporting cell 1 within glass block 20 including springs, clamps, and the like. To further protect the plastic dielectric 7 against moisture absorption, the air within the block 20 can be replaced by nitrogen, helium, argon, or any other dry inert gas and thereafter the vent hole can be sealed tight with an appropriate sealant.

It will be apparent from the foregoing description that an electroluminescent cell has been disclosed which insures that the phosphor particles will not only remain suspended but will be unable to agglomerate and touch each other so as to effect adversely the efficiency of the cell. Moreover, the electroluminescent cell construction of the present invention protects the plastic sheet 7 carrying the phosphor particles from moisture permeation and consequent reduction of light output from the cell since the cell is surrounded by the moisture impermeable glass block.

While the illustrative embodiments of the invention have been described hereinbefore with particularity, it will be understood that various other modifications will be apparent to and can readily be made by those skilled in the art without departing from the scope and spirit of the invention. Accordingly, it is not intended that the scope of the claims appended hereto be limited to the description set forth herein but rather that the claims be construed as encompassing all the features of patentable novelty which reside in the present invention including all features which would be treated as equivalents thereof by those skilled in the art to which the invention pertains.

I claim:

1. An electroluminescent cell of improved construction comprising two parallel light-transmitting layers each coated on the sides facing each other with a transparent conducting layer, a light-transmitting liquid dielectric contained between said layers in sealed relationship, an electroluminescent phosphor carrying solid plastic dielectric member disposed within said liquid dielectric and substantially parallel to said light-transmitting layers and out of contact with said conducting layers, and a source of alternating current connected to each of said conductive layers for excitation of said phosphor carrying dielectric.

2. The cell of claim 1 in which the light-transmitting layers have lateral edges and means sealing the edges of said light-transmitting layers.

3. An electroluminescent glass block in which the cell of claim 1 is encased within a protective transparent hollow glass block and the source of alternating current is positioned externally of the glass block.

References Cited in the file of this patent

UNITED STATES PATENTS

| | | |
|---|---|---|
| 2,216,220 | Baker | Oct. 1, 1940 |
| 2,714,683 | Jenkins | Aug. 2, 1955 |
| 2,837,660 | Orthuber et al. | June 3, 1958 |
| 2,919,361 | Tschakert | Dec. 29, 1959 |
| 2,944,177 | Piper | July 5, 1960 |

OTHER REFERENCES

"The New Phenomenon of Electroluminescence and its Possibility for Investigating Crystal Lattice," by Prof. G. Destriau, Philosophical Magazine, Ser. 7, vol. 38, No. 285, October 1947, pages 700–739.